United States Patent
Weidner

(10) Patent No.: US 6,556,686 B1
(45) Date of Patent: Apr. 29, 2003

(54) PROGRAMMABLE HEARING AID DEVICE AND METHOD FOR OPERATING A PROGRAMMABLE HEARING AID DEVICE

(75) Inventor: Tom Weidner, Nuremberg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 0 days.

(21) Appl. No.: 09/532,072

(22) Filed: Mar. 21, 2000

(30) Foreign Application Priority Data

Apr. 14, 1999 (DE) ......................................... 199 16 900

(51) Int. Cl.[7] .............................................. H04R 25/00
(52) U.S. Cl. ......................... 381/312; 381/314; 381/60
(58) Field of Search ................................. 381/312, 314, 381/315, 322, 323, 324, 60; 600/559; 181/130, 135

(56) References Cited

U.S. PATENT DOCUMENTS

| 5,404,407 A | * | 4/1995 | Weiss | ........................ 381/323 |
| 5,721,783 A | | 2/1998 | Anderson | |
| 5,799,095 A | | 8/1998 | Hanright | |
| 6,088,465 A | | 7/2000 | Hanright et al. | |
| 6,175,635 B1 | * | 1/2001 | Meyer et al. | ................ 381/314 |
| 6,229,900 B1 | * | 5/2001 | Leenen | ........................ 381/314 |
| 6,236,731 B1 | * | 5/2001 | Brennan et al. | ............ 381/314 |

FOREIGN PATENT DOCUMENTS

| DE | OS 195 41 648 | 5/1997 |
| DE | OS 196 00 234 | 7/1997 |
| EP | 0 341 903 | 11/1994 |

* cited by examiner

Primary Examiner—Duc Nguyen
Assistant Examiner—Suhan Ni
(74) Attorney, Agent, or Firm—Schiff Hardin & Waite

(57) ABSTRACT

In a programmable hearing aid device, keys are provided for enabling and/or disenabling functions, performance features or programmable adjustments. Hardware keys and software keys are used in order to prevent an inexpert, defective or unauthorized usage of the hearing aid device.

19 Claims, 2 Drawing Sheets

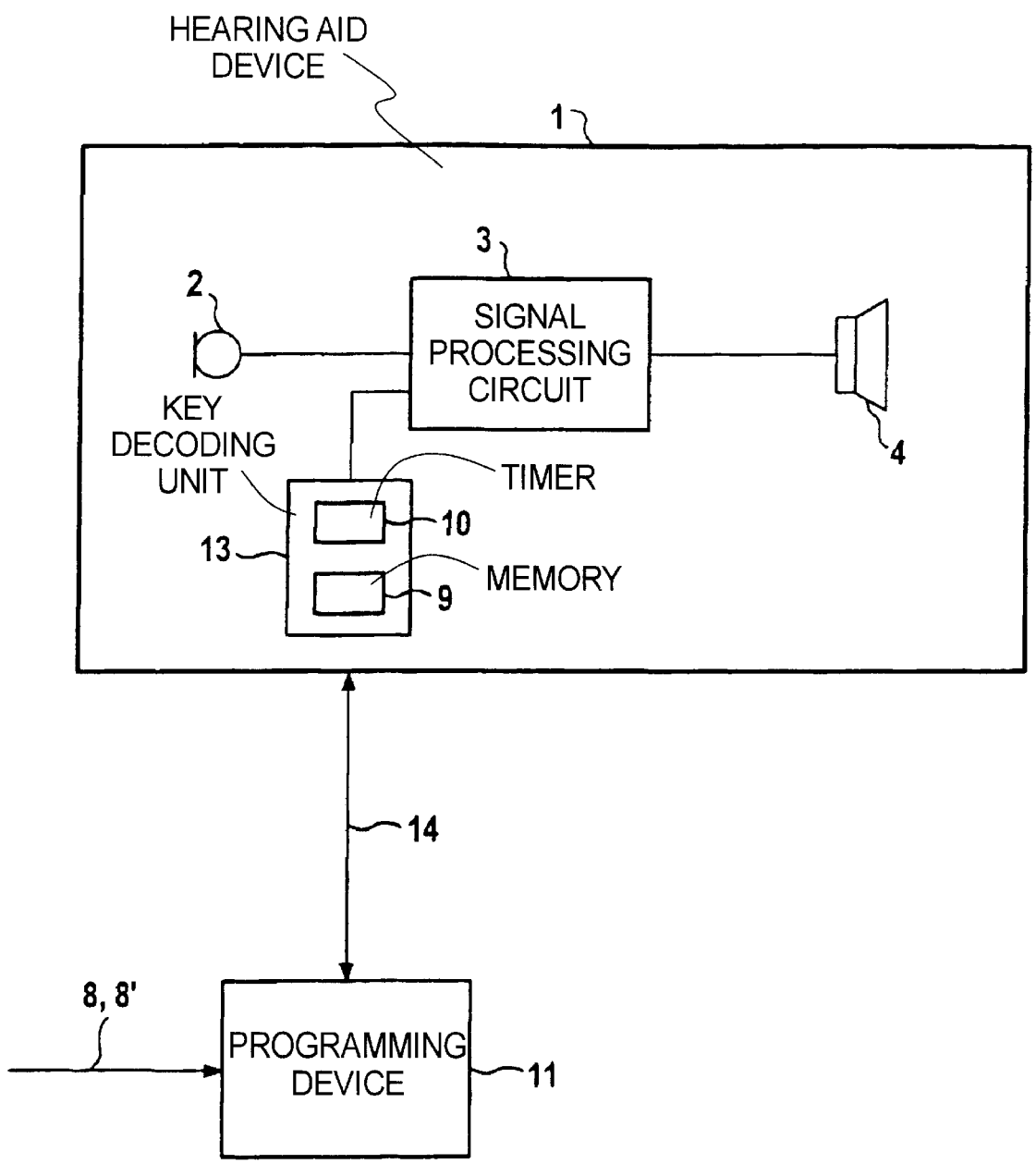

PROGRAMMABLE HEARING AID DEVICE AND METHOD FOR OPERATING A PROGRAMMABLE HEARING AID DEVICE

BACKGROUND OF THE INVENTION

1. Field of the Invention

The present invention is directed to a programmable hearing aid device with at least one acoustoelectric input transducer, a signal processing circuit and an electroacoustic output transducer. The invention is also directed to a method for operating such a hearing aid device.

2. Description of the Prior Art

Currently, most hearing aid device manufacturers offer a number of different types of hearing aid devices, which considerably differ from one another with respect to equipment, functionality and performance. Offering such different versions, however, increases the costs of manufacture, inventory storage, etc., particularly for relatively small piece numbers.

Hearing aid devices are known, which, using standard hardware as a basis, are specifically adaptable to the needs of the person wearing the hearing aid by means of hardwiring or the burning of different fuses (fusible links).

Once such a customization has been made, however, further changes of are possible only to an extremely limited extent. For example, U.S. Pat. No. 5,721,783 discloses a hearing aid device with such a customized programmable semiconductor component.

Further, German OS 195 41 648 discloses a means for transferring programming data to hearing aid devices. The programming data are supplied to a hearing aid adaption device via an interface and are deposited in a customer unit.

European Application 0 341 903 discloses a hearing aid device with a programming means and a storage means. A disenabling means fixes the operation of the hearing device given the reception of programming data.

Further, German OS 196 00 234 discloses an arrangement for adapting hearing aid devices, wherein adjustment data are transferred in an encoded form.

Programmable hearing aid devices offer the possibility to take customer wishes into consideration and to individually adapt the hearing aid devices. Nevertheless, it is not possible for manufacturers of known hearing aid devices to make only the features, among the maximally possible features, available to the customer (person wearing a hearing device, or hearing device acoustician), which the customer actually needs, and thus to only change the customer according to the actually-needed features.

SUMMARY OF THE INVENTION

An object of the present invention is to provide a hearing aid device and a method for operating a hearing aid device, wherein adaptation to individual customer wishes is possible with simple means and wherein an inappropriate, defective or unauthorized usage is prevented.

In a programmable hearing aid device with at least one electroacoustic input transducer, a signal processing circuit and an electroacoustic output transducer, and in a method for operating such a hearing aid device, this object is achieved with the invention by providing at least one key or code for enabling and/or disenabling properties of the hearing aid device.

The key contains information that is arbitrarily stored (for example mechanically, electrically, magnetically), this information being transferable to the hearing aid device and is necessary for enabling and/or disenabling specific properties of the hearing aid device.

The aforementioned properties of the hearing aid device are functions that can be selected by the person wearing the hearing device, such as different hearing programs for different environmental situations or hearing situations or the selection of the signal input via the microphone or a hearing coil, and also include all adjustments that can be modified by means of programming and general performance features of the hearing aid device, such as the number of selectable programs or maximal value of the acoustic amplification. The invention differentiates between the "maximal" properties that are fixed by the hardware and between the properties that are available to the customer, the latter properties normally being a subset of these maximal properties. Therefore, the properties of the hearing aid device that are actually available to the customer are essentially fixed by the content of the selected key. For that purpose, the utilized key preferably acts on the signal processing circuit and determines its parameters and program execution.

The invention makes it possible to produce hearing aid devices that do not differ from one another with respect to their hardware and that can also be divided into different hearing aid device types by the manufacturer in a simple way.

Hearing aid devices according to the invention significantly differ from programmable hearing aid devices according to the prior art in that they can also be adapted and reprogrammed, however, the limits, within which such modifications can be made, can be fixed in a simple way and the hearing aid manufacturer can fix these differently from hearing aid device to hearing aid device.

In the ideal case, identical signal processing circuits therefore can be used for all types of hearing aid devices and a correspondingly large piece number can be produced as a result. This reduces costs in the manufacture, the inventory maintenance, and the distribution.

A further advantage is that the person who adapts the hearing device to the patient (hearing device acoustician or otolaryngologist, for example) does not have to decide on one hearing device type before the actual adaptation; this is particularly advantageous given in-the-ear hearing aid devices due to the need for an individually molded housing. Therefore, different hearing device types can be adapted and tried in the same housing, and the decision about the necessary hearing device type or desired hearing device type can be made after the successful adaptation.

Therefore, a completely new pricing is possible for the manufacturer. The customer only pays for the actually required and utilized properties of the hearing aid device. When properties of the hearing aid device are to be expanded or restricted at a later point in time, the manufacturer can do so without great outlay.

The inventive signal processing circuit of a hearing aid device should be as efficient as possible and should allow a number of functions and programmable adjustments. It is dependent on the utilized key to what extent these performance features and functions are then enabled or disenabled. Taking the maximal properties fixed by the hardware as a basis, arbitrary subsets thereof can be possible. It should be noted that even properties of the hearing aid device which do not have the capability being changed in hearing aid devices according to the prior art, can also be inventively adjusted by means of programming. Given a key for a signal processing circuit, which maximally allows four hearing programs P1 through P4, only the programs P1 and P2, for example, can be enabled and therefore can be selectable by the person wearing a hearing device. A further example is a signal processing circuit that allows signal processing in maximally four separate channels, but only four two-channel signal processing is enabled by the utilized key.

The invention also provides for a lock, such as the restriction of the upper limits or lower limits of the appertaining quantities, for a few properties. Thus, the maximally possible acoustic amplification of 80 dB that is fixed by the hardware could be reduced, for example, to an acoustic amplification of 75 dB available to the person wearing the hearing device, or could be reduced to every arbitrary value <80 db by means of the utilized key for a particular hearing aid device.

In an embodiment, a number of different keys are inventively provided. Therefore, it is possible for the manufacturer, in a simple and inexpensive manner, to offer a number of different device types at different prices, which device types initially do not differ from one another at the times of manufacture. Apart from dividing the hearing aid devices into different hearing aid device types, an individual enabling of properties, which is adapted to the needs of each single customer, is also possible with appropriate pricing associated therewith.

According to different versions of the invention, the key or the keys can be fashioned as hardware key(s) or as software key(s).

A hardware key is attached to the hearing aid device or is attached in the hearing aid device as an additional component and fixes the properties, i.e. the functions and/or performance features and/or programmable adjustments, of the signal processing circuit that are available to the customer, and therefore fixes the properties of the hearing aid device available to the customer.

According to an embodiment of the invention, the hardware key can be detachably attached to the hearing aid device or in the hearing aid device. Thus, it is possible that a hearing aid device of one type can be transformed into another type in a simple way by means of exchanging the hardware key. Therefore, it is possible for the person wearing a hearing device to test different hearing device types in a simple and inexpensive manner before he or she decides on a specific type. This also makes it possible to react to a changing hearing behavior of the person wearing a hearing device. In many cases, it is then no longer necessary to get a new hearing aid device in order to adapt to changing hearing. Rather, the change can be reacted to it by means of the simple and inexpensive exchange of the key.

The hardware key can be exchanged in a particularly simple fashion when it, from outside, can be inserted into an opening and/or holding device provided at the housing of the hearing aid device. In a particularly inexpensive version of the invention the hardware key is directly inserted into the programming jack. As a result thereof, the hardware key can be attached to an existing hearing aid device without changing the housing and can be connected to the signal processing circuit.

However, it is also possible to integrate the hardware key firmly and unremovably to the hearing aid device or in the hearing aid device. Therefore, the setting of the respective hearing aid device type can only be undertaken directly at the manufacturer.

Different versions are possible for the fashioning of the hardware key. The hardware key will normally have a carrier, which has passive and/or active electrical components, and means for the signal exchange with the signal processing circuit. The hardware key also can include storage elements and processors and, in turn, can set up an active communication with the hearing aid device. The invention is not restricted exclusively to electrical encoding means, however, optical, magnetic or mechanical encoding are also possible. A combination of these encoding types is also possible. In all cases, an inventive hearing aid device has a counterpart matching the respective hardware key, the counterpart cooperating with the key and transferring the information regarding the properties to be enabled to the hearing aid device, which information is stored in the key.

In another embodiment of the invention a software key prescribes the hearing aid device type. Thereby, a signal that can be transferred to the hearing aid device performs the function of the key. For that purpose for example, in connection with an external programming device, a signal can be entered in the programming device, at the beginning or at the end of the adaptation, in the form of a codeword and can be transferred to the hearing aid device in a hardwired manner. All known wireless signal transmission techniques, such as infrared transmission, ultrasonic transmission or electromagnetic transmission, are also possible. The signal can also be directly transferable to the hearing aid device without routing through an external programming device.

The software key is a signal that is transferable to the hearing aid device, this signal is provided by the hearing aid manufacturer and is preferably known only to the manufacturer. There is the risk, however, that a signal that has been transferred once could be transferred to further hearing aid devices in an unauthorized manner by a hearing device acoustician or an otolaryngologist, for example. Protection against unauthorized usage is therefore particularly important with respect to the software key. According to an embodiment of the invention, this protection is achieved by providing every hearing aid device with a unique device identification. In the most simple case, this identification is composed of an identification number that is deposited in a memory in the hearing aid device. Protection against an inexpert or unauthorized usage of the hearing aid device is now guaranteed because only one software key, which is validated by the respective device identification of the hearing aid device, effects enabling and/or disenabling of specific functions and/or performance features and/or programmable adjustments. Therefore, the manufacturer alone has the information about which software key cooperates with which hearing aid device in which way.

According to the invention, a combination of a hardware key and a software key can also act as a valid key for enabling and/or disenabling specific properties of the hearing aid device, such as a magnetic card in connection with a codeword. Not only must the magnetic card be inserted in the hearing aid device, but also a valid codeword has to be transferred for effecting enabling.

According to an additional version of the invention, further locks can be introduced for protecting against unauthorized usage. For example, the hearing aid device may accept only a limited number of invalid software keys for enabling and/or disenabling of specific properties of the hearing aid device. As a result, the enabling is disenabled (prevented) at least for a limited period of time after the transmission of a number of successive software keys that are invalid with respect to the respective device identification.

In a further embodiment, a signal proceeds from the inventive hearing aid device, this signal informing the user as to whether a valid key is present and/or which hearing aid device type has been prescribed by means of the cooperation of the hearing aid device with a corresponding key.

In another embodiment of the invention, it is also possible that functions and/or performance features and/or programmable adjustments can be enabled without the corresponding key for a limited period of time, during the adaptation, for example. Thus, the hearing device acoustician, for example, does not have to settle on a hearing aid device type already before the adaptation. This is particularly advantageous with respect to in-the-ear hearing aid devices due to the individualized housing. Therefore, different hearing aid device types can be adapted and tested in the same housing and the decision about the necessary hearing aid device type or desired hearing aid device type can be made after the successful adaptation. Therefore, the hearing device acoustician initially has available all possibilities of the hearing aid device, however, the person wearing the hearing device mainly has to pay only for the actually required and utilized properties of the hearing aid device. In an advantageous embodiment, a signal ensues subsequent to the adaptation for identifying the key required for the enabling of the selected programming of an inventive hearing aid device, or a programming device that can be connected thereto.

According to a further embodiment of the inventive hearing aid device, only such functions and/or performance features and/or programmable adjustments of the hearing aid device, which have been enabled by means of the previously inserted key, are possible during the programming or adaptation. Thus, the customer can still decide on a specific hearing aid device type in advance. Preferably, the programming software takes this circumstance into consideration in that the functions and/or performance features and/or programmable adjustments that are disenabled for the selected hearing aid device type are specifically marked (flagged) and/or are no longer available. For facilitating the programming, it is helpful when the hearing aid device and/or programming device generates an error message when a disenabled function is used.

DESCRIPTION OF THE DRAWINGS

FIG. 2 schematically shows the transfer of a software key to a hearing aid device in accordance with the invention.

DESCRIPTION OF THE PREFERRED EMBODIMENTS

Figure 1:
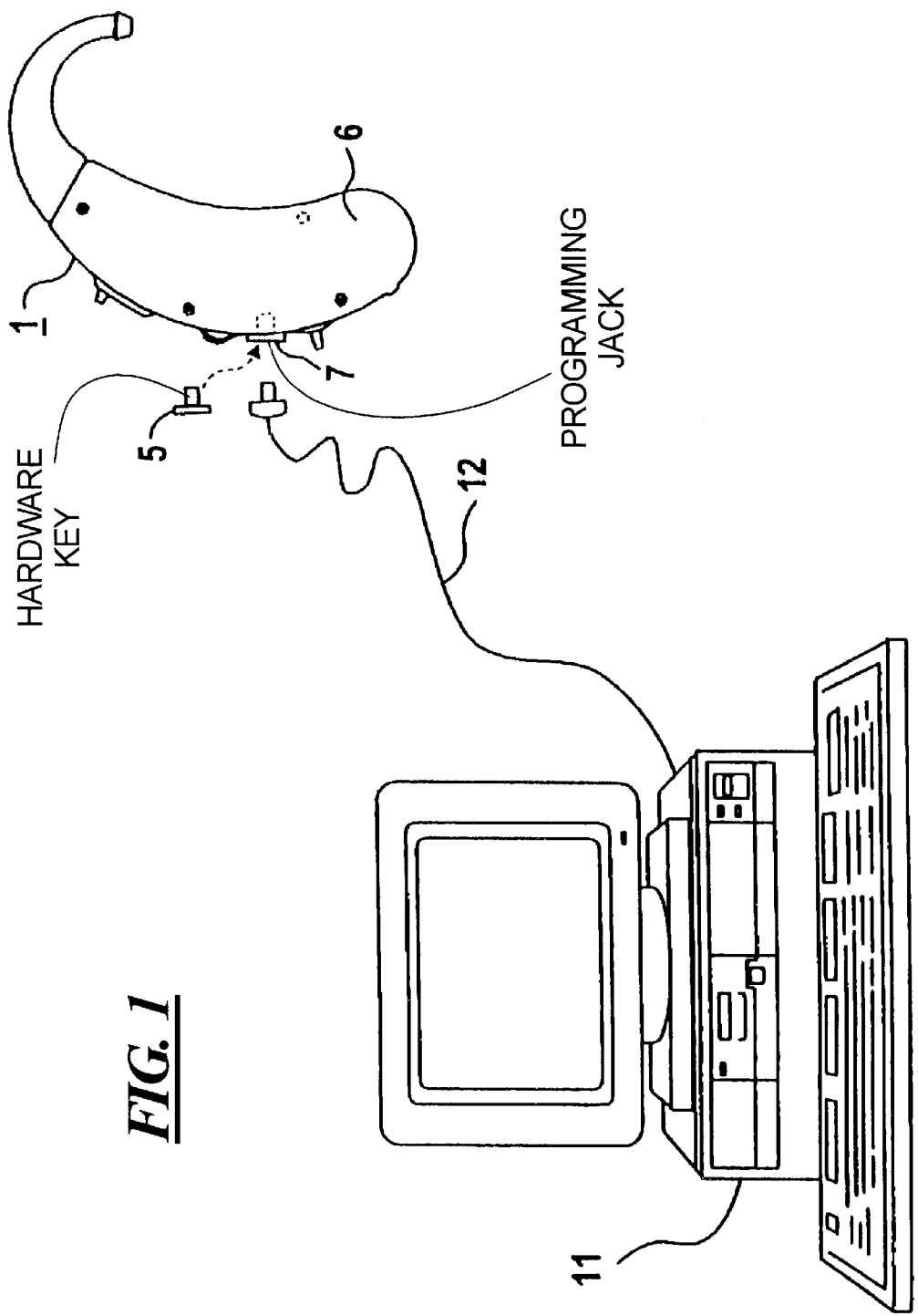
FIG. 1 shows a hearing aid device in accordance with the invention with a hardware key.

The exemplary embodiment according to FIG. 1 shows a behind-the-ear hearing aid device 1 with an open programming jack covering.

The hardware key 5 is fashioned such that it can be inserted in the programing jack 7 and makes electrical contact with it. The programming jack cover can also be closed when the hardware key 5 is inserted, so that the hardware key 5 is not visible in the normal operating state of the hearing aid device 1, but is available and exchangeable at any time required. During the programming or adaptation of the hearing aid device 1, the hearing aid device 1 is connected to an external programming device 11 by a line 12 connected to the programming jack 7. As long as the hearing aid device 1 is connected to the programming device 11, all functions, the maximally possible performance features and all programmable adjustments of the hearing aid device are available. At the end of the programming or, respectively, adaptation, it can be seen at the programming device 1 which key is required for enabling the desired functions, performance features and programmable adjustments. If the line 12 is removed, the properties of the hearing aid device 1 required for the person wearing the hearing aid device 1 are not enabled until the corresponding hardware key 5 is inserted.

FIG. 2 schematically shows a hearing aid device 1 with an acoustoelectric input transducer 2, a signal processing circuit 3 and an electroacoustic output transducer 4. Further shown in the hearing aid device 1 are a memory 9, which contains a unique device identification and a timer 10. The hearing aid device 1 is connected to a programming device 11 via a bidirectional data line 14. A software key 8 is introduced into the programming device 11 in the form of a codeword, which is transferred to the key decoding unit 13 via the bidirectional data line 14. The key 8 is checked and decoded there with respect to its validity, initially in connection with the device identification. The valid key effects enabling of the properties of the hearing aid device 1 that are associated therewith and that are defined by the hearing device manufacturer. A timer 10 is started at the same time as the transfer of the software key 8, whose effect is canceled when the timer 10 times out. Therefore, a fixed time for testing the adapted hearing aid device is available to a person wearing a hearing device. The adaptation can be repeated and tested until the person wearing the hearing aid device agrees with the adaptation and with the properties of the hearing aid device 1, which are individually adapted to his or her needs. Only then is the software key 8 transferred for the enabling of these properties without time limits.

Although modifications and changes may be suggested by those skilled in the art, it is the intention of the inventor to embody within the patent warranted hereon all changes and modifications as reasonably and properly come within the scope of his contribution to the art.

I claim as my invention:

1. A programmable hearing aid device adapted to be worn by a user, comprising:

an acoustoelectric input transducer arrangement which receives incoming audio signals and which emits an electrical input signal corresponding thereto;

an adjustable signal processing circuit connected to said input transducer arrangement, and supplied with said electrical input signal, for processing said electrical input signal dependent on an adjustment status of said signal processing circuit, and which emits a processed signal;

an electroacoustic output transducer connected to said signal processing circuit and supplied with said processed signal, and emitting an output audio signal corresponding to said processed signal;

said acoustoelectric input transducer arrangement and said signal processing circuit forming a combination having a number of properties selected from the group consisting of functions, performance features and programmable adjustments of said signal processing circuit; and at least one installed key software that is incapable of actuation by said user, which generates a key signal supplied to said signal processing circuit for performing a key function which alters the number of said properties available to said user so that at least one of said properties is not available to and is incapable of being selected by said user.

2. A programmable hearing aid device as claimed in claim 1 comprising a plurality of different software keys respectively for performing a key function for disabling different ones of said properties.

3. A programmable hearing aid device as claimed in claim 1 comprising a source for said software key, and a hardwired connection from said source at least to said signal processing circuit.

4. A programmable hearing aid device as claimed in claim 1 comprising a source for said software key, and a transmitter for wirelessly transmitting said software key from said source at least to said signal processing circuit.

5. A programmable hearing aid device as claimed in claim 1 wherein said software key includes a unique hearing aid device identification.

6. A programmable hearing aid device as claimed in claim 5 further comprising a memory for storing said unique hearing aid device identification.

7. A programmable hearing aid device as claimed in claim 5 further comprising validation circuitry for allowing said software key to perform said key function only upon validation of said unique hearing aid device identification.

8. A programmable hearing aid device as claimed in claim 7 wherein said validation circuitry disenables said key function, at least for a limited time, after a predetermined number of invalid software keys are attempted.

9. A programmable hearing aid device as claimed in claim 7 wherein said validation circuitry includes means for emitting a validity signal indicating validity of said software key.

10. A programmable hearing aid device as claimed in claim 7 wherein said validity circuit includes a timer which sets a time limit on validity of a currently employed software key.

11. A programmable hearing aid device as claimed in claim 1 further comprising a signal transmitter which emits a signal indicating a presence of said software key.

12. A programmable hearing aid device as claimed in claim 1 further comprising a signal transmitter which emits a signal indicating a type of said software key.

13. A programmable hearing aid device as claimed in claim 1 further comprising a circuit allowing said at least one property to be enabled without said software key for a predetermined period of time.

14. A programmable hearing aid device as claimed in claim 13 comprising a circuit for emitting a signal for identifying and marking a plurality of keys for enabling selected programs of said signal processing circuit.

15. A programmable hearing aid device as claimed in claim 1 further comprising at least one software key for disenabling at least one of said properties during programming of at least said signal processing circuit.

16. A programmable hearing aid device as claimed in claim 15 further comprising a signal transmitter which emits a signal upon an attempt to program a property which has been disenabled.

17. A method for operating a programmable hearing aid device, to be worn by a user, comprising the steps of:

providing said hearing aid device with a plurality of available properties selected from the group consisting of functions, performance features and programmable adjustments;

installing a software key in said hearing aid device that is incapable of actuation by said user, which generates a key signal which performs a key function in said hearing aid device; and selectively enabling and disenabling at least one of said properties with said key function to alter the number of said properties available to said user thereby making at least one of said properties unavailable to and incapable of being selected by said user.

18. A method as claimed in claim 17 comprising enabling and disenabling different ones of said properties with respectively different software keys.

19. A method as claimed in claim 17 comprising transferring said software key from an external software key source to said hearing aid device as a code word.

* * * * *